United States Patent
Li et al.

(10) Patent No.: US 6,249,394 B1
(45) Date of Patent: Jun. 19, 2001

(54) METHOD AND APPARATUS FOR PROVIDING AMPLITUDE INSTABILITY DATA RECOVERY FOR AMR/GMR HEADS

(75) Inventors: Robert Yuan-Shih Li, Fremont; Xiang-Jun (Leon) Feng, San Jose; Hoan Andrew Au, Palo Alto; Peter Cheng-I Fang, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/248,804

(22) Filed: Feb. 12, 1999

(51) Int. Cl.[7] .................................................. G11B 27/36
(52) U.S. Cl. ................................. 360/31; 360/66; 360/53
(58) Field of Search ................................. 360/31, 66, 53, 360/68, 46, 67, 75, 71

(56) References Cited

U.S. PATENT DOCUMENTS

| | | | |
|---|---|---|---|
| 5,134,533 | * | 7/1992 | Friedrich et al. ..................... 360/324 |
| 5,189,566 | * | 2/1993 | Christensen et al. .................. 360/53 |
| 5,309,298 | | 5/1994 | Klaasen et al. . |
| 5,442,492 | | 8/1995 | Cunningham et al. . |
| 5,514,953 | | 5/1996 | Schultz et al. . |
| 5,661,614 | | 8/1997 | Wallash et al. . |
| 5,748,399 | * | 5/1998 | Gill ..................................... 360/314 |

* cited by examiner

*Primary Examiner*—Alan T. Faber
(74) *Attorney, Agent, or Firm*—Altera Law Group, LLC

(57) ABSTRACT

A method and apparatus for providing amplitude instability data recovery for AMR/GMR heads during amplitude loss using MSE and/or amplitude envelope detection procedures. The method includes (a) initiating a data recovery procedure by selecting a detection mode for detecting when an error condition occurs, (b) performing the selected detection mode, (c) determining a reset action for resetting the magnetic head, (d) performing the reset action to reset the magnetic head and (f) re-reading data in the track after performing the reset action. An embodiment of the invention further includes (g) determining whether the resetting of the magnetic head allowed recovery of the data in the track and (h) terminating the data recovery procedure when the data is recovered. An embodiment of the invention further includes (i) determining whether predetermined limits have been exhausted when the data is not recovered, (j) terminating the data recovery procedure when the predetermined limits have been exhausted and repeating steps (a)–(g) when the predetermined limits have not been exhausted. In an embodiment of the invention, the determining a reset action for resetting the magnetic head further includes applying a maximum write current to the head, toggling a head bias current, toggling the head bias current and the write current, or applying a reset pulse to the head.

28 Claims, 8 Drawing Sheets

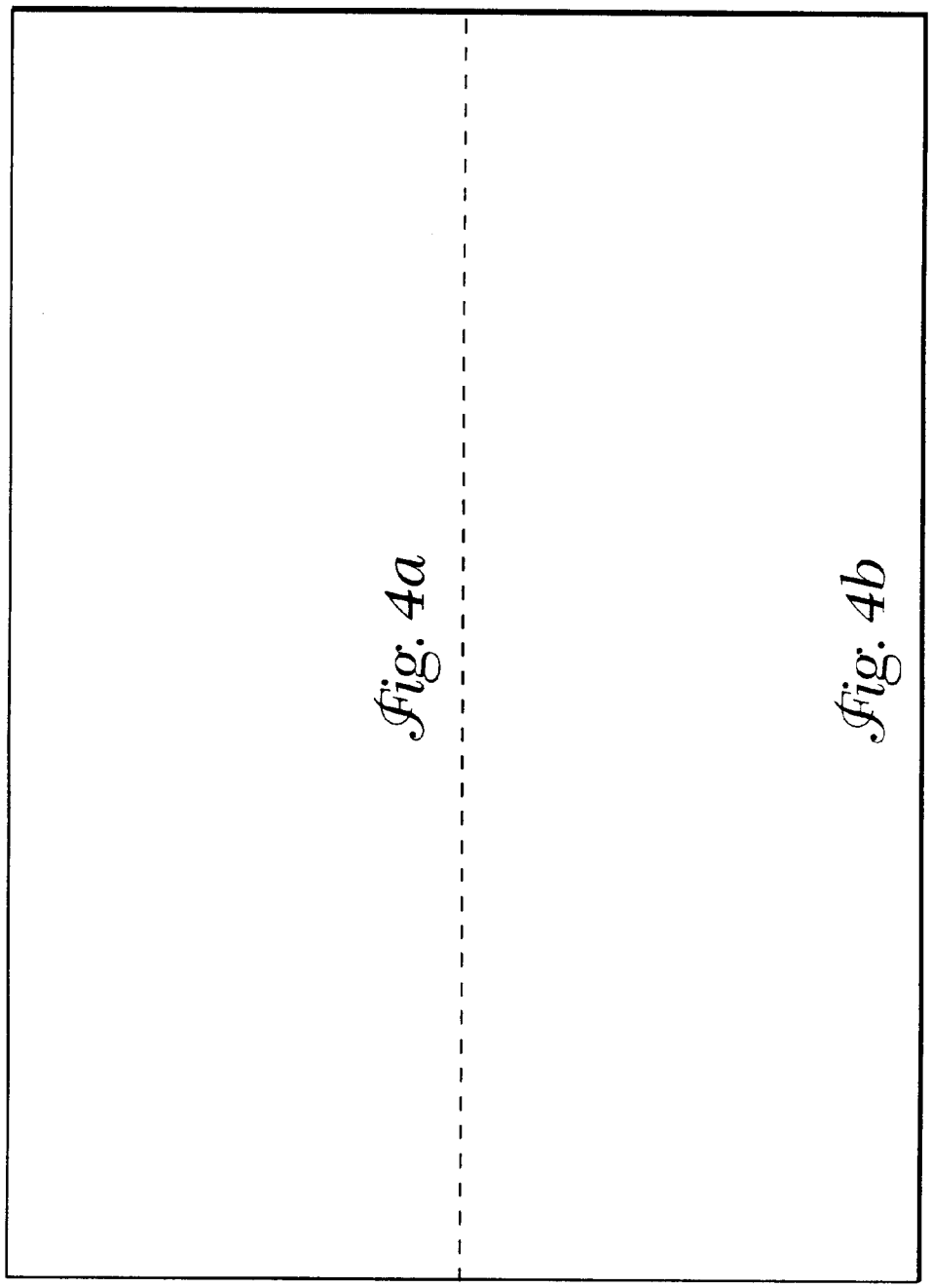

METHOD AND APPARATUS FOR PROVIDING AMPLITUDE INSTABILITY DATA RECOVERY FOR AMR/GMR HEADS

BACKGROUND OF THE INVENTION

1. Field of the Invention.

This invention relates in general to data storage devices, and more particularly to method and apparatus for providing amplitude instability data recovery for AMR/GMR heads.

2. Description of Related Art.

In a disk drive the MR head is mounted on a slider which is connected to a suspension arm, the suspension arm urging the slider toward a magnetic storage disk. When the disk is rotated the slider flies above the surface of the disk on a cushion of air which is generated by the rotating disk. The MR head then plays back recorded magnetic signals (bits) which are arranged in circular tracks on the disk.

The MR sensor is a small stripe of conductive ferromagnetic material, such as Permalloy (NiFe), which changes resistance in response to a magnetic field such as magnetic flux incursions (bits) from a magnetic storage disk. The conventional MR sensor operates on the basis of the anisotropic magnetoresistive (AMR) effect in which a component of the read element resistance varies as the square of the cosine of the angle between the magnetization in the read element and the direction of sense current flowing through the read element. Recorded data can be read from a magnetic medium because the external magnetic field from the recorded medium (the signal field) causes a change in the direction of magnetization in the read element, which in turn causes a change in resistance in the read element and a corresponding change in the sensed current or voltage. Conventional MR sensors based on the AMR effect thus provide an essentially analog signal output, wherein the resistance and hence signal output is directly related to the strength of the magnetic field being sensed.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr, Co/Cu, or Co/Ru multilayers exhibiting strong antiferromagnetic coupling of the ferromagnetic layers. This GMR effect has also been observed for these types of multilayer structures, but wherein the ferromagnetic layers have a single crystalline structure and thus exhibit uniaxial magnetic anisotropy, as described in U.S. Pat. No. 5,134,533 and by K. Inomata, et al., J. Appl. Phys. 74 (6), Sept. 15, 1993. The physical origin of the GMR effect is that the application of an external magnetic field causes a reorientation of all of the magnetic moments of the ferromagnetic layers. This in turn causes a change in the spin-dependent scattering of conduction electrons and thus a change in the electrical resistance of the multilayered structure. The resistance of the structure thus changes as the relative alignment of the magnetizations of the ferromagnetic layers changes. MR sensors based on the GMR effect also provide an essentially analog signal output.

In high density disk drives bits are closely spaced linearly about each circular track. In order for the MR head to playback the closely spaced bits the MR head has to have high resolution. This is accomplished by close spacing between the first and second shield layers, caused by thin first and second gap layers, so that the MR sensor is magnetically shielded from upstream and downstream bits with respect to the bit being read.

An MR head is typically combined with an inductive write head to form a piggyback MR head or a merged MR head. In either head the write head includes first and second pole pieces which have a gap at a head surface and are magnetically connected at a back gap. The difference between a piggyback MR head and a merged MR head is that the merged MR head employs the second shield layer of the read head as the first pole piece of the write head. A conductive coil induces magnetic flux into the pole pieces, the flux flinging across the gap and recording signals on a rotating disk. The write signals written by the write head are large magnetic fields compared to the read signals shielded by the first and second shield layers. Thus, during the write operation a large magnetic field is applied to one or more of the shield layers causing a dramatic rotation of the magnetic moment of the shield layer.

Magnetic recording data storage technologies, particularly magnetic disk drive technologies, have undergone enormous increases in stored data per unit area of media (areal data density). This has occurred primarily by reducing the size of the magnetic bit through a reduction in the size of the read and write heads and a reduction in the head-disk spacing.

However, it has been found that some AMR and/or GMR heads exhibit severe amplitude instability such that data cannot be properly read from the disk. In this instance, an error is detected which in turn triggers some corrective action. An error detected while the data is being read form the disk is commonly referred to as a read error, a soft read error is an error that is possible to correct. Many times the correction of the read error is handled without interrupting the computer system which is beyond the rotating disk storage device. The soft read error would also be corrected before the user becomes aware of it.

A multistep procedure referred to as a data recovery procedure is (DRP) attempted to recover data when the storage device encounters a soft error. When the steps in the data recovery procedure are unable to correct a read error, then the read error is referred to as a hard error. Hard errors mean that data have been lost. Once data are read with a high error rate or lost from a particular portion of a disk, such as a sector, the area is reallocated to another spare portion on the disk drive. During the reallocation, some errors may be recovered.

For example, one problem encountered with MR sensors is Barkhausen noise caused by the irreversible motion of magnetic domains in the presence of an applied filed. It is know that Barkhausen noise is eliminated by creation of a single magnetic domain in the sense current region of the MR element. However, multiple magnetic domains may be formed during fabrication of the MR element. Further, as the dimensions of MR and GMR heads decrease, the MR and GMR heads are increasingly susceptible to low level electrical stress (ES) events that can cause the amplitude of the heads to become unstable and create a high number of soft or hard error events.

For example, the head amplitude can become suddenly as low as half of the normal value, and then become normal again, and after an unpredictable period become abnormal once again during write/read operations.

It can be seen that there is a need for a method and apparatus for providing amplitude instability data recovery for AMR/GMR heads.

SUMMARY OF THE INVENTION

To overcome the limitations in the prior art described above, and to overcome other limitations that will become apparent upon reading and understanding the present specification, the present invention discloses a method and apparatus for providing amplitude instability data recovery for AMR/GMR heads.

The present invention solves the above-described problems by providing a data recovery procedure for head amplitude loss using Mean Square Error (MSE) and/or amplitude envelope detection procedures.

A method in accordance with the principles of the present invention includes (a) initiating a data recovery procedure by selecting a detection mode for detecting when an error condition occurs, (b) performing the selected detection mode, (c) determining a reset action for resetting the magnetic head, (d) performing the reset action to reset the magnetic head and (e) re-reading data in the track after performing the reset action.

Other embodiments of a system in accordance with the principles of the invention may include alternative or optional additional aspects. One such aspect of the present invention is that method further includes (f) determining whether the resetting of the magnetic head allowed recovery of the data in the track and (g) terminating the data recovery procedure when the data is recovered.

Another aspect of the present invention is that the method further includes (h) determining whether predetermined limits have been exhausted when the data is not recovered, (i) terminating the data recovery procedure when the predetermined limits have been exhausted and repeating steps (a)–(f) when the predetermined limits have not been exhausted.

Another aspect of the present invention is that the selecting a detection mode further comprises choosing a mean square error procedure, an amplitude envelopeprocedure or a combination procedure.

Another aspect of the present invention is that the mean square error procedure further comprises determining whether a mean square error range for data read in the track exceeds a predetermined mean square error limit.

Another aspect of the present invention is that the performing the selected detection mode further includes reinitiating the data recovery procedure when the mean square error range for data read in the track does not exceed the predetermined mean square error limit and returning to (c) when the mean square error range for data read in the track exceeds the predetermined mean square error limit.

Another aspect of the present invention is that the amplitude envelope procedure further includes determining whether an amplitude of a read signal is below a predetermined amplitude limit.

Another aspect of the present invention is that the performing the selected detection mode further includes reinitiating the data recovery procedure when the amplitude of the read signal is not below the predetermined amplitude limit and returning to (c) when the amplitude of the read signal is below the predetermined amplitude limit.

Another aspect of the present invention is that the combination procedure further includes determining whether a mean square error range for data read in the track exceeds a predetermined mean square error limit, returning to (c) when the mean square error range for data read in the track exceeds the predetermined mean square error limit, determining when an amplitude of a read signal is below a predetermined amplitude limit when the mean square error range for data read in the track does not exceed the predetermined mean square error limit, reinitiating the data recovery procedure when the amplitude of the read signal is not below the predetermined amplitude limit and returning to (c) when the amplitude of the read signal is below the predetermined amplitude limit.

Another aspect of the present invention is that the determining a reset action for resetting the magnetic head further includes applying a maximum write current to the head, toggling a head bias current, toggling the head bias current and the write current, or applying a reset pulse to the head.

Another aspect of the present invention is that the performing the reset action further includes applying a maximum write current to the head.

Another aspect of the present invention is that the performing the reset action further includes toggling the head bias current.

Another aspect of the present invention is that the performing the reset action further includes toggling the head bias current and the write current.

Another aspect of the present invention is that the performing the reset action further includes applying a reset pulse to the head.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing amplitude instability data recovery for AMR/GMR heads. The present invention performs a data recovery procedure for head amplitude loss using MSE and/or amplitude envelope detection procedures.

Figure 1:
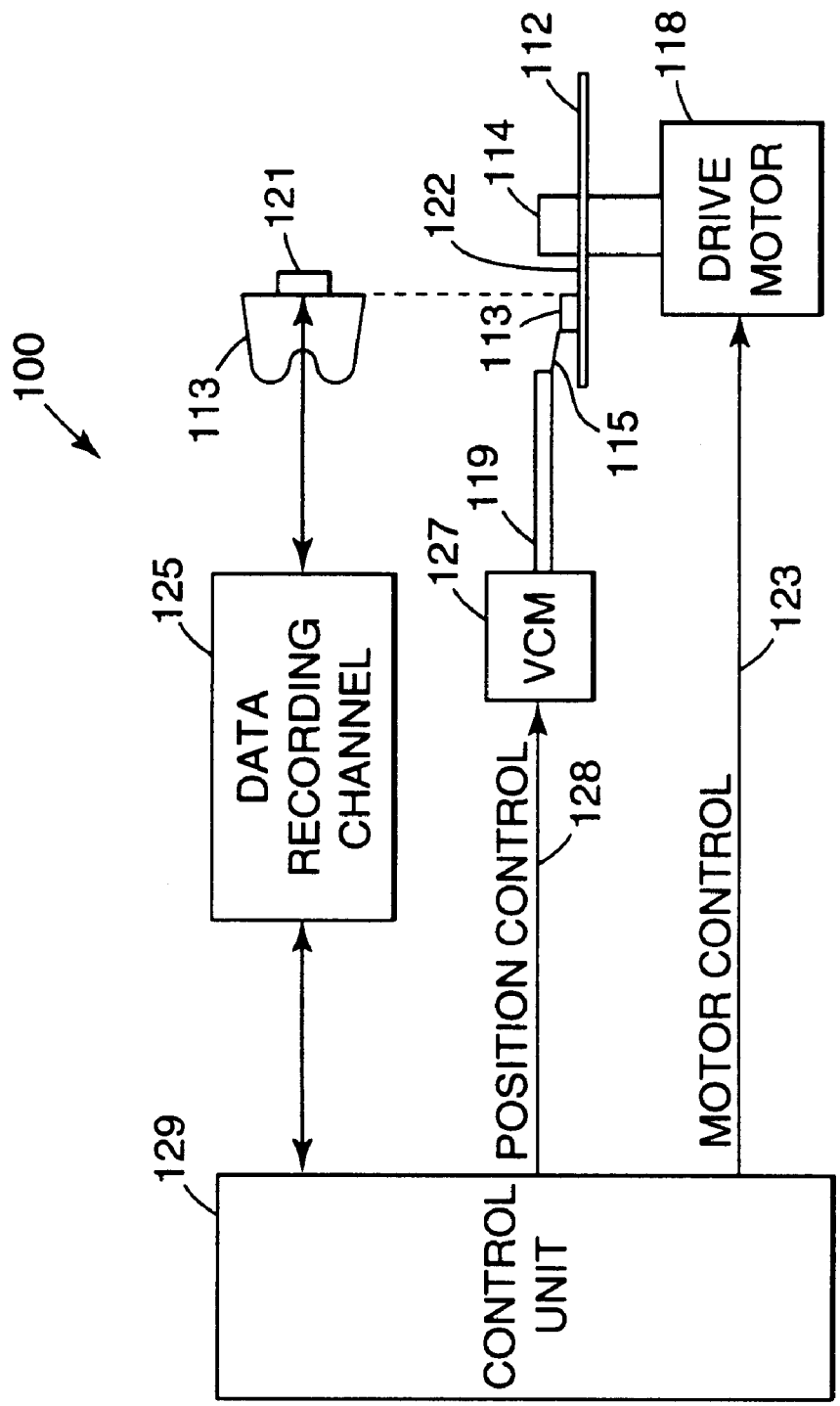
FIG. 1 illustrates a disk drive embodying the present invention.

FIG. 1 illustrates a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned on the disk 112, each slider 113 supporting one or more magnetic read/write heads 121 where the head 121 incorporates the MR sensor of the present invention. As the disks rotate, slider 113 is moved radically in and out over disk surface 122 so that heads 121 may access different portions of the disk where desired data is recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 5o the desired data track on disk 112. Read and write signals are communicated to and from read/write heads 121 by means of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
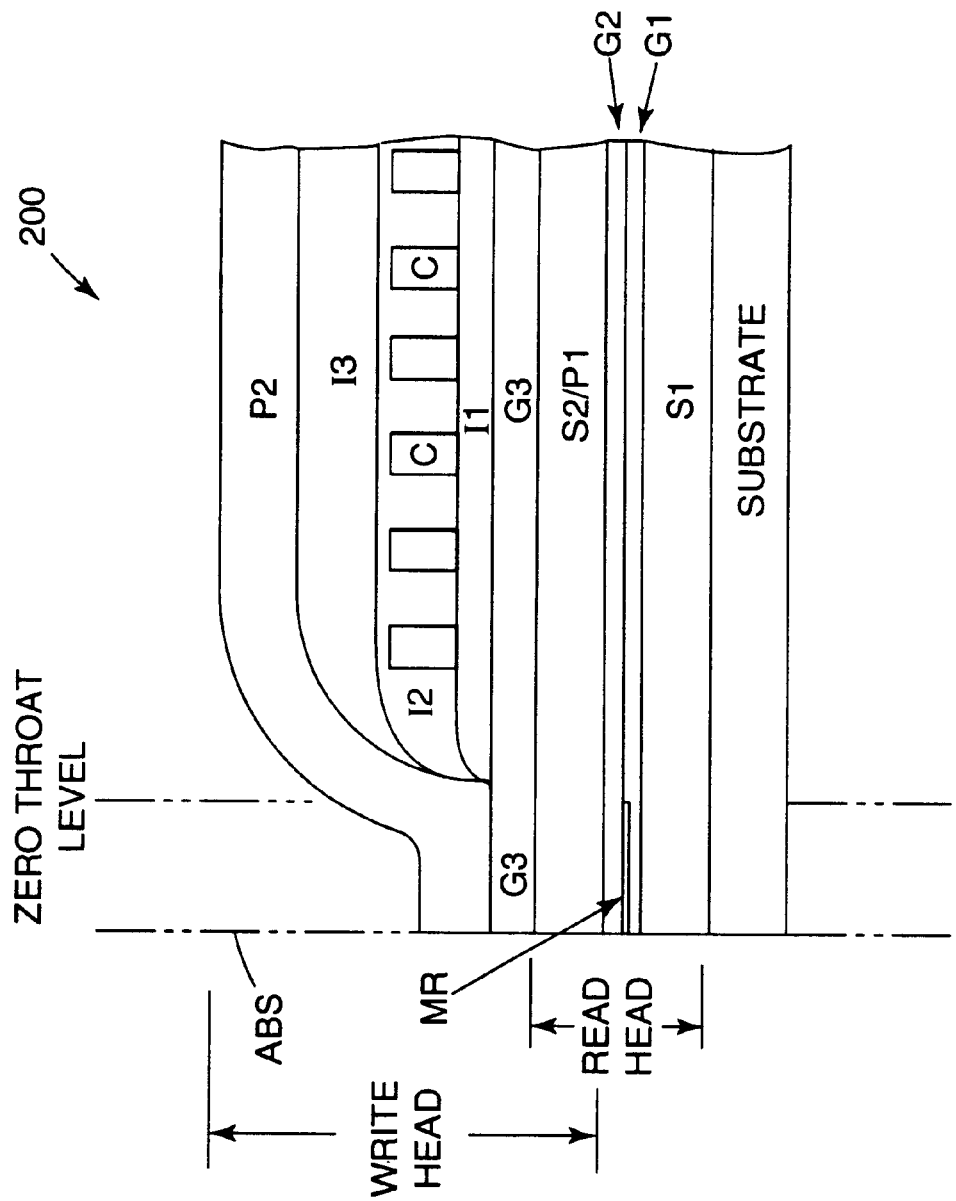
FIG. 2 is a side cross-sectional schematic illustration of the merged MR head.

FIG. 2 is a side cross-sectional schematic illustration of the merged MR head 200. The merged MR head 200 includes a read head portion and a write head portion which are lapped to an air beating surface (ABS), the air bearing surface being spaced from the surface of the rotating disk by the air bearing as discussed hereinabove. The read head portion includes an MR sensor which is sandwiched between first and second gaps layers G1 and G2 which, in turn, are sandwiched and second shield layers S1 and S2. The write head portion includes a coil layer C and insulation layer I2 which are sandwiched between insulation layers I1 and I3 which in turn are sandwiched between first and second pole pieces P1 and P2. A gap layer G3 is sandwiched between the first and second pole pieces at their pole tips adjacent the ABS for providing a magnetic gap. When signal current is conducted through the coil layer C, signal flux is induced into the first and second pole layers P1 and P2 causing signal fringe flux across the pole tips of the pole pieces at the ABS. This signal fringe flux is induced into circular tracks on the rotating disk 116, shown in FIG. 1, during a write operation. During a read operation, recorded magnetic flux signals on the rotating disk are induced into the MR sensor of the read head causing a change in the resistance of the MR sensor which can be sensed by a change in potential across the MR sensor responsive to a sense current (not shown) conducted through the MR sensor. These changes in potential are processed by the drive electronics 236 shown in FIG. 2. The combined head illustrated in FIG. 2 is a merged MR head in which the second shield layer S2 is employed as a first pole piece P1 for the combined head. In a piggyback head (not shown) the second shield layer S2 and the first pole piece P1 are separate layers.

Figure 4A:
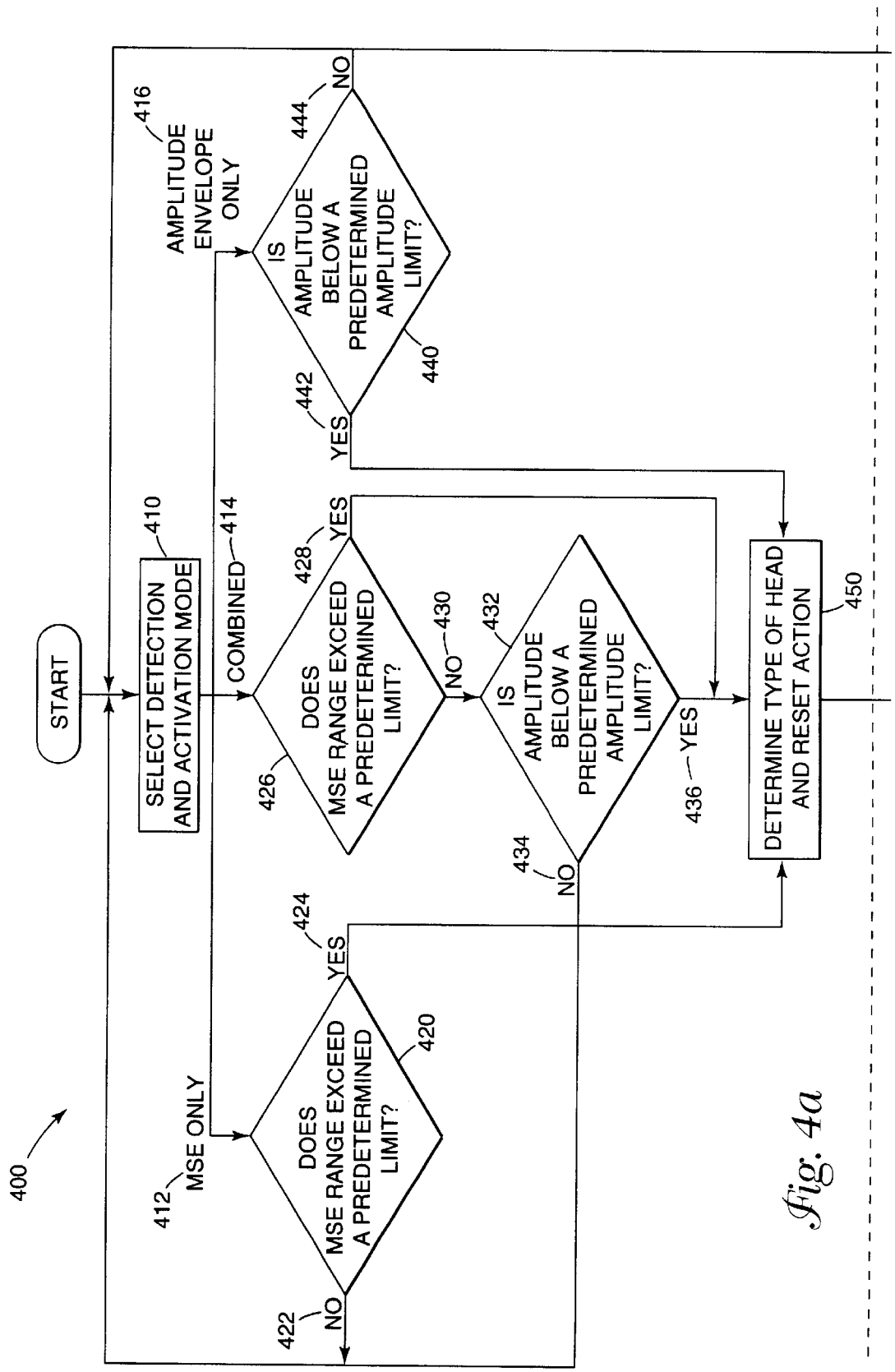
FIG. 4 illustrates a flow chart for providing amplitude instability data recovery for AMR/GMR heads according to the present invention.
Figure 4B:
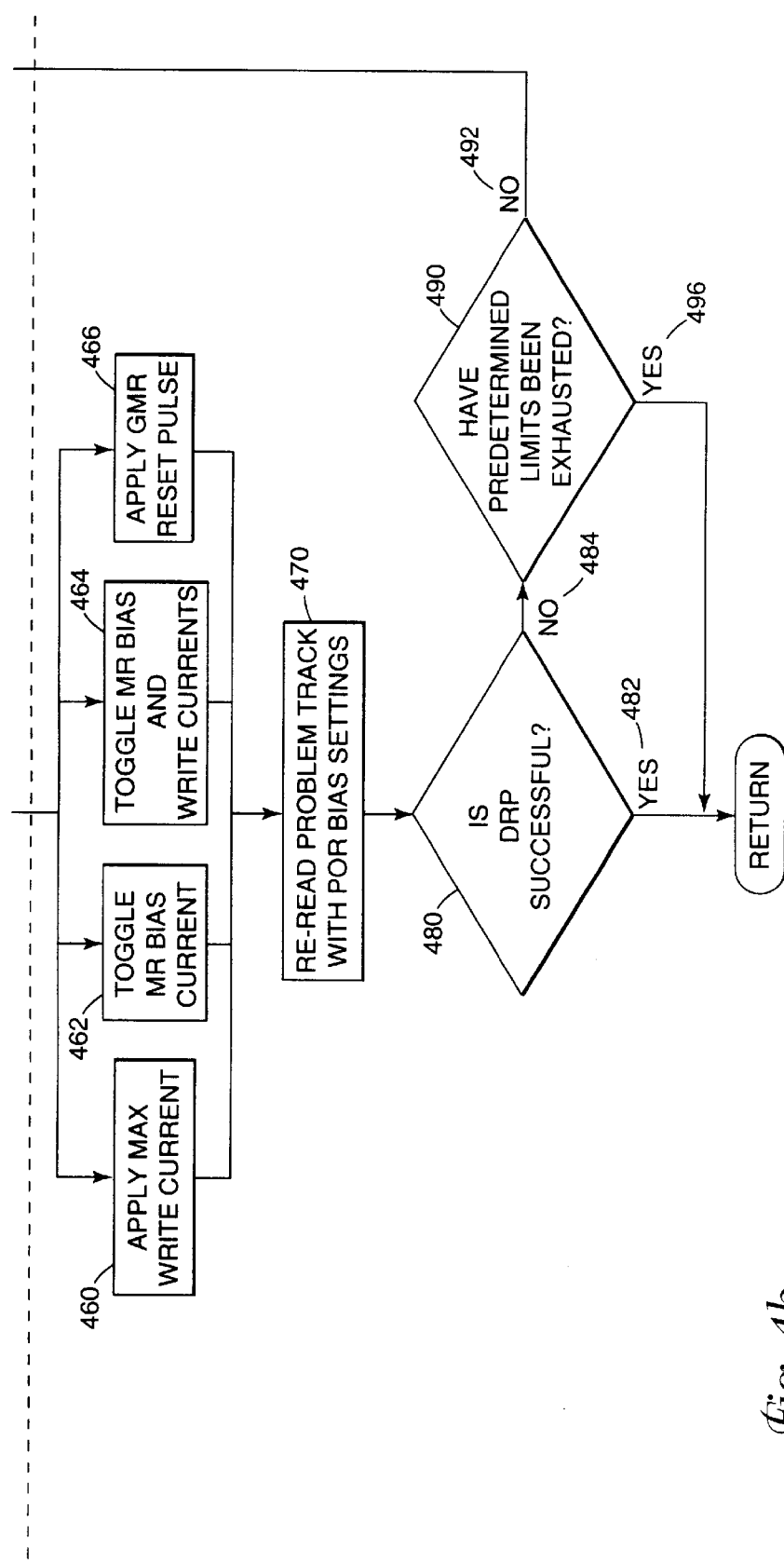

FIG. 2 illustrates the overall physical arrangement of the layers used in forming a merged MR head 200. However, FIG. 2 does not show the leads to the MR sensor. As mentioned above, the leads required significantly larger area than the area required of the MR sensor. Furthermore, the gap coverage at the edge of the leads is poor and potential for shield-to-lead shorts for high density (thin gap) heads increase significantly. However, since most of the shorts are from the leads to the shields, the leads should be designed to prevent shield-to-lead shorts. FIG. 4 illustrates, with respect to GMR heads, how the leads are attached to the sensors.

Figure 3:
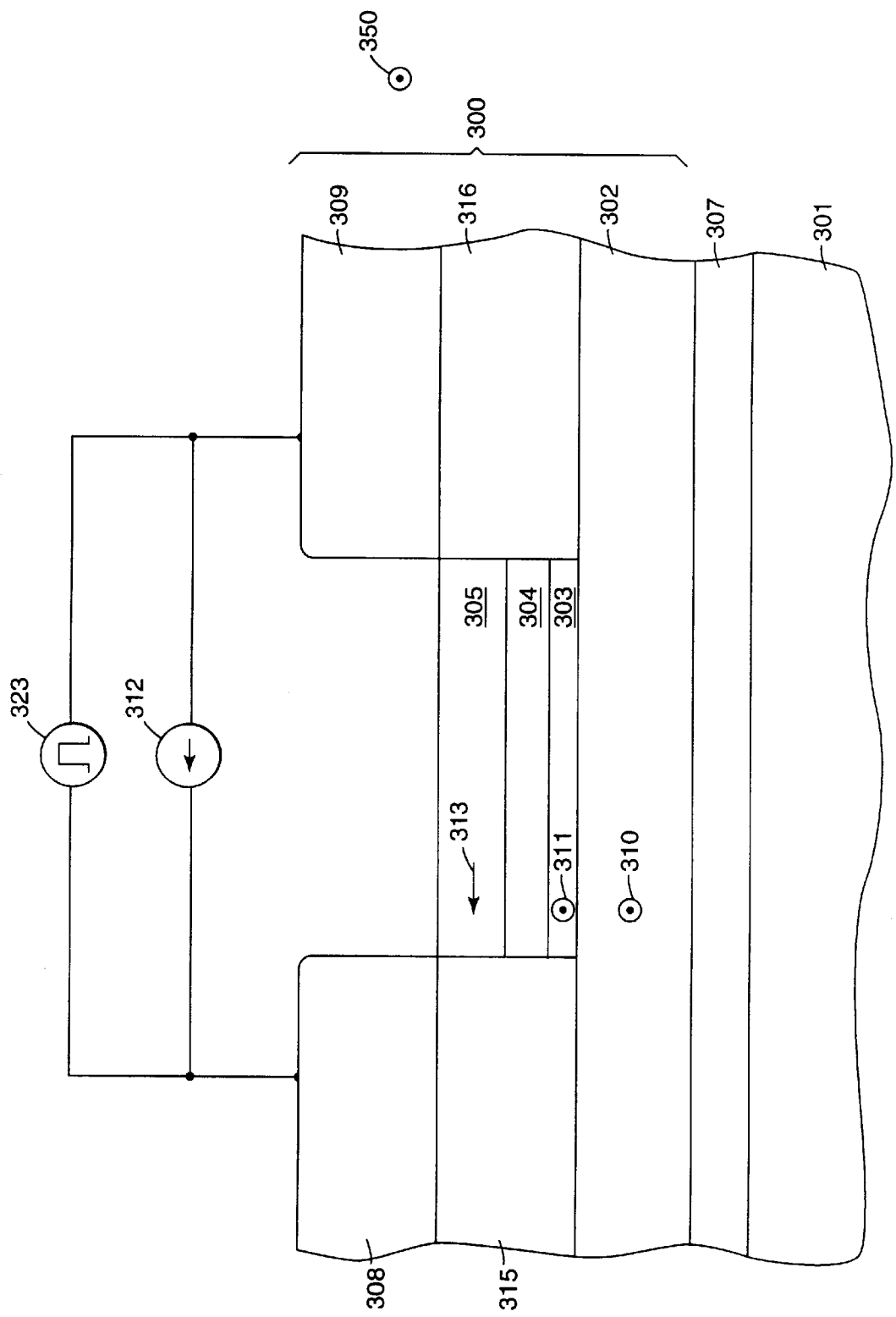
FIG. 3 is a cross-sectional plan view of a spin valve sensor according to the invention.

FIG. 3 depicts an example of a spin valve sensor 300 which the invention may be practiced. The view of FIG. 3 depicts a plan view of the air bearing surface of a substrate 301 containing the spin valve 300. The substrate's air bearing surface normally rides upon a cushion of air, which separates it from a magnetic data storage medium such as a disk or tape.

The sensor 300 includes a plurality of substantially parallel layers including an antiferromagnetic layer 302, a ferromagnetic pinned layer 303, a conductive layer 304, and a ferromagnetic free layer 305. The sensor 300 also includes hard bias layers 315-316, the operation of which is discussed in greater detail below. The sensor 300 is deposited upon an insulator 107, which lies atop the substrate 301. Adjacent layers preferably lie in direct atomic contact with each other.

The antiferromagnetic layer 302 comprises a type and thickness of antiferromagnetic substance suitable for use as a pinned layer in spin valves, e.g., a 400 Å layer of NiO. The ferromagnetic pinned layer 303 comprises a type and thickness of ferromagnetic substance suitable for use in spin valves, e.g., about 10–40 Å of Co. The conductor layer 304 comprises a type and thickness of conductive substance suitable for use in spin valves, e.g., about 20–30 Å of Cu. The ferromagnetic free layer 305 comprises a type and thickness of ferromagnetic substance suitable for use as a free layer in spin valves, e.g., about 30–150 Å of NiFe. The hard bias layers 315–316 provide the free layer 305 with a desired quiescent: magnetization. The hard bias layers 315–316 preferably comprise a magnetic material with high coercivity, such as CoPtCr.

Despite the foregoing detailed description of the sensor 300, the present invention may be applied using many different sensor arrangements in addition to this example. For example, ordinarily skilled having the benefit of this disclosure will recognize various alternatives to the specific materials and thickness described above.

The sensor 300 exhibits a predefined magnetization. Magnetization of the sensor 300, including the ferromagnetic layers 303/305 and the antiferromagnetic layer 302, is performed in accordance with the invention. The sensor 300 may be magnetized prior to initial operation, such as during the fabrication or assembly processes. Or, the sensor 300 may be magnetized after some period of operating the sensor 300, where the sensor 300 loses its magnetic orientation due to a traumatic high temperature event such as electrostatic discharge. A process for magnetization of the sensor 100 is discussed in greater detail below.

Whether magnetized before or after initial operation of the sensor 300, the magnetized components of the sensor 300 are ultimately given the same magnetic configuration. In particular, the antiferromagnetic layer 302 has a magnetic orientation in a direction 310. For ease of explanation, conventional directional shorthand is used herein, where a circled dot indicates a direction coming out of the page (like an arrow's head), and a circled x indicates a direction going into the page (like an arrow's tail). The neighboring ferromagnetic pinned layer 303 has a magnetic moment pinned in a parallel direction 311, due to antiferromagnetic exchange coupling between the layers 302–303.

Unlike the pinned layer 303, the free layer 305 has a magnetic moment that freely responds to external magnetic fields, such as those from a magnetic storage medium. The free layer 305 responds to an external magnetic field by changing its magnetic moment, which in turn changes the resistance of the spin valve 300. In the absence of any other magnetic fields, the free layer 305 orients itself in a direction 313, which is oriented 90° to the directions 310–311. This quiescent magnetization direction is due to biasing of the free layer 305 by the hard bias layers 315–316.

The sensor 300 may also include various accessories to direct electrical current and magnetic fields through the sensor 300. A small but constant sense current, for example, is directed through the sensor 300 to provide a source of scattering electrons for operation of the sensor 300 according to the GMR effect. At different times, a relatively large current pulse or waveform is directed through the sensor 300 to establish the magnetization direction of the sensor 300. FIG. 3 also depicts the sensor 300 in relation to the various features that help direct current through the sensor 300.

The sensor 300 is attached to a pair of complementary leads 308–309 to facilitate electrical connection to a sense current source 312. The leads 308–309 also facilitate electrical connection to a pulse current source 323. The leads 308–309 preferably comprise 500 Å of Ta with a 50 Å underlayer of Cr, or another suitable thickness and type of conductive material. The attachment of leads to magnetoresistive sensors and spin valves is a well known technique, familiar to those of ordinary skill in the art.

A technique for establishing a predetermined magnetic orientation of spin valve sensor or GMR head has been developed and is disclosed in copending, and commonly owned U.S. patent application Ser. No. 08/855,141, now U.S. Pat. No. 5,748,399, herein incorporated by reference. This technique will be explained with reference to FIG. 3.

Via the leads 308–309, the pulse current source 323 directs an electrical pulse current through the layers 303–305. Chiefly, the pulse current heats the antiferromagnetic layer 302 past its blocking temperature. For an additional measure of magnetization biasing, the pulse current source 323 may be configured to provide pulse current in an appropriate direction to enhance biasing of the antiferromagnetic layer 302 in the direction 310. The pulse current flows from the lead 309 to the lead 308. To satisfy the foregoing purposes, the current source 323 comprises a suitable device to provide a current pulse of sufficient amplitude and duration to bring the antiferromagnetic layer 302 past its blocking temperature, thereby freeing the magnetic orientations of this layer as well as the associated ferromagnetic pinned layer 303.

In addition to heat, the current pulse also provides a magnetic field that magnetically orients the antiferromagnetic layer 302 in accordance with the well known right-hand rule of electromagnetics. The pulse current lasts sufficiently long to both remove any magnetic orientation of the antiferromagnetic layer and also to reorient the layers in accordance with the magnetic field created by the flowing current.

The magnetic orientation of the antiferromagnetic layer 302 has the effect of pinning the magnetization directions of the ferromagnetic pinned layer 303. This occurs because of the strong exchange coupling between the antiferromagnet-ferromagnet pair 302/303. More particularly, the antiferromagnetic layer 302 pins the ferromagnetic pinned layer 303 in a direction parallel to its own direction. The pulse current source 323 then applies a bias current to orient the magnetic field of ferromagnet layer 305.

FIG. 4 illustrates a flow chart 400 for providing amplitude instability data recovery for AMR/GMR heads according to the present invention. The method illustrated in the flow chart 400 of FIG. 4 may be performed by the recording channel 125 or control unit 129 of FIG. 1. First, a specific detection mode is used to activate a head amplitude loss recovery/data recovery procedure 410. A mean square error (MSE) mode may be implemented 412. Alternatively, an amplitude envelope mode may be selected 416. A third alternative involves a combined mode 414, wherein MSE and an amplitude envelope mode may be used.

If the MSE only mode is selected 412, a determination is made as to whether the MSE range exceeds a predetermined limit 420. If the MSE range does not exceed a predetermined limit, the amplitude loss recovery method cycles to the beginning 422. If the MSE range exceeds the predetermined limit 424, then a determination of the type of head is made and a reset action is selected 450.

If the amplitude envelope only mode is selected 416, a determination is made as to whether the amplitude is below a predetermined amplitude limit 440. If the amplitude is not below a predetermined amplitude limit 444, the amplitude loss recovery method cycles to the beginning 422. If the amplitude is below a predetermined amplitude limit 442, then a determination of the type of head is made and a reset action is selected 450.

Thirdly, if the combined mode is selected 414, a determination is made as to whether the MSE range exceeds a predetermined limit 426. If the MSE range exceeds the predetermined limit 428, then a determination of the type of head is made and a reset action is selected 450. If the MSE range does not exceed the predetermined limit 430, the amplitude loss recovery method determines whether the amplitude is below a predetermined limit 432. Then, if the amplitude is not below a predetermined amplitude limit 434, the amplitude loss recovery method cycles to the beginning 422. If the amplitude is below a predetermined amplitude limit 442, then a determination of the type of head is made and a reset action is selected 450.

The head/reset action selection 450 determines the action that is to be performed to determine what data recovery method is to be used. A first method is to apply a maximum write current to the head 460. A second method involves toggling the MR bias current to the MR element to attempt to reset the head 462. A third method involves the toggling of the MR bias current (Ib) and the write current (Iw) according to a predetermined sequence 464, (see, for example, FIG. 6). A fourth method, used for GMR heads, involves applying a GMR reset pulse to reset the layers of a GMR head 466.

After the reset action is selected and performed, the problem track is re-read with POR bias settings 470. Then a determination is made as to whether the data recovery procedure was successful 480. If the data recovery procedure was successful 482, the data recovery method is terminated. If the data recovery procedure was not successful 484, a determination is made as to whether predetermined limits for the data recovery method have been exhausted 490. If the predetermined limits have been exhausted 496, the data recovery method is terminated. If the predetermined limits have not been exhausted 492, the data recovery method recycles to the beginning 410.

Figure 5:
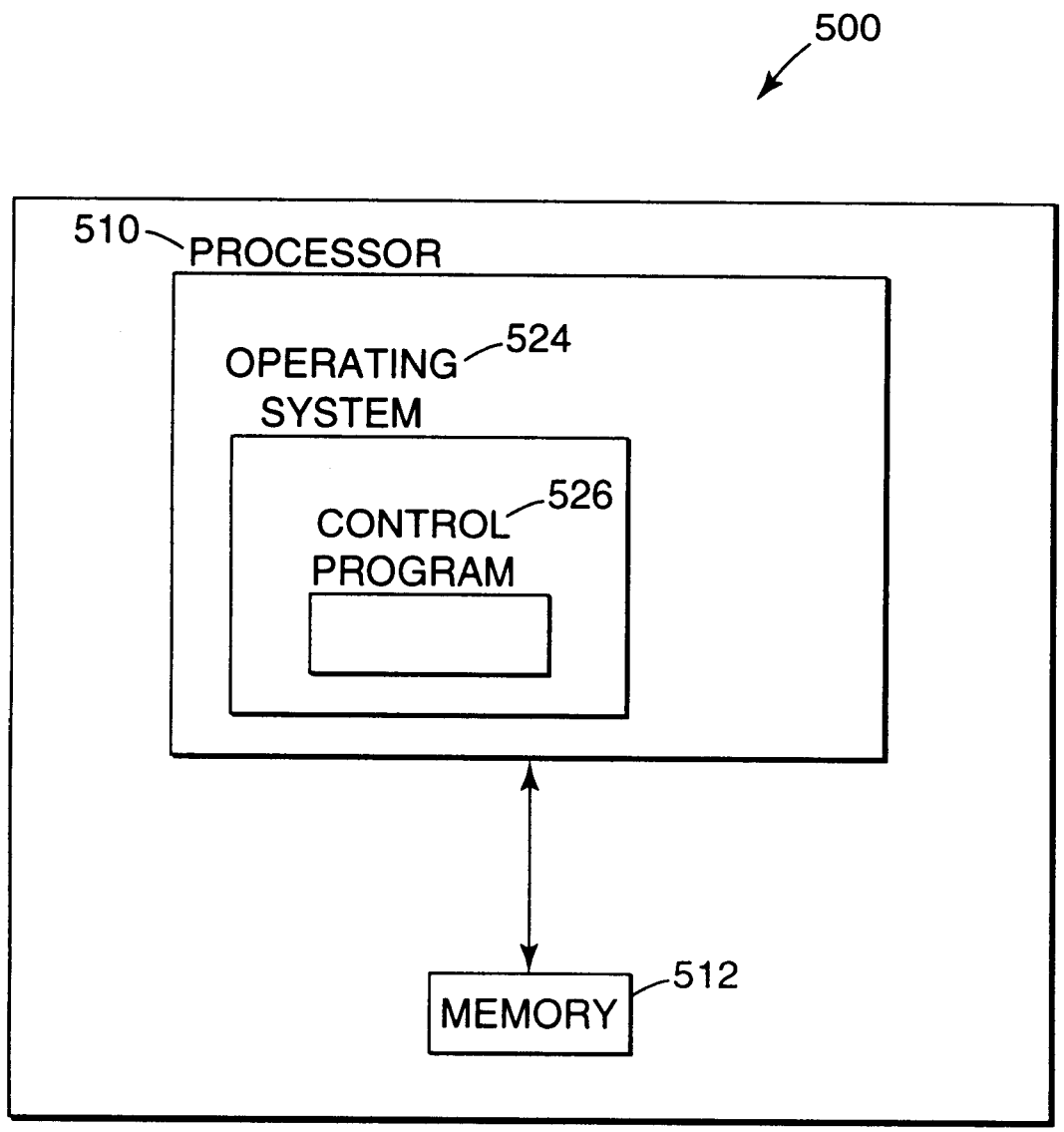
FIG. 5 is a block diagram that illustrates an exemplary hardware environment for implementing the data recovery procedure of FIG. 4.

FIG. 5 is a block diagram 500 that illustrates an exemplary hardware environment for implementing the data recovery procedure of FIG. 4. The present invention is typically implemented in a control unit or in the data channel, and comprises a processor 510 including random access memory (RAM), read-only memory (ROM), and other components 512. The processor 510 operates under the control of an operating system 524. The processor 510 executes one or more computer programs 526 under the control of the operating system 524. The present invention comprises a method for providing amplitude instability data recovery for AMR/GMR heads.

Figure 6A:
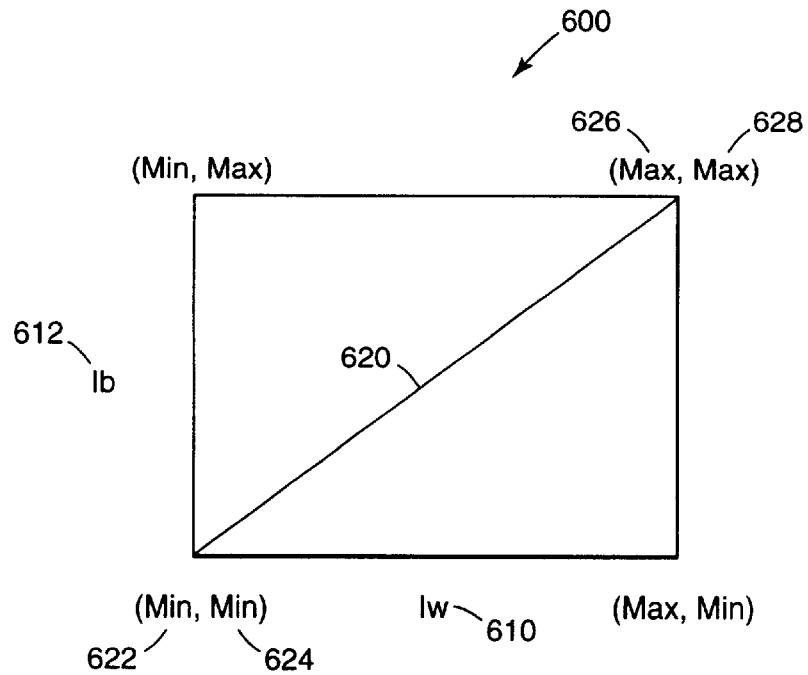
FIGS. 6a–b illustrate two excitation methods for toggling the MR bias current (Ib) and the write current (Iw) according to the present invention.
Figure 6B:
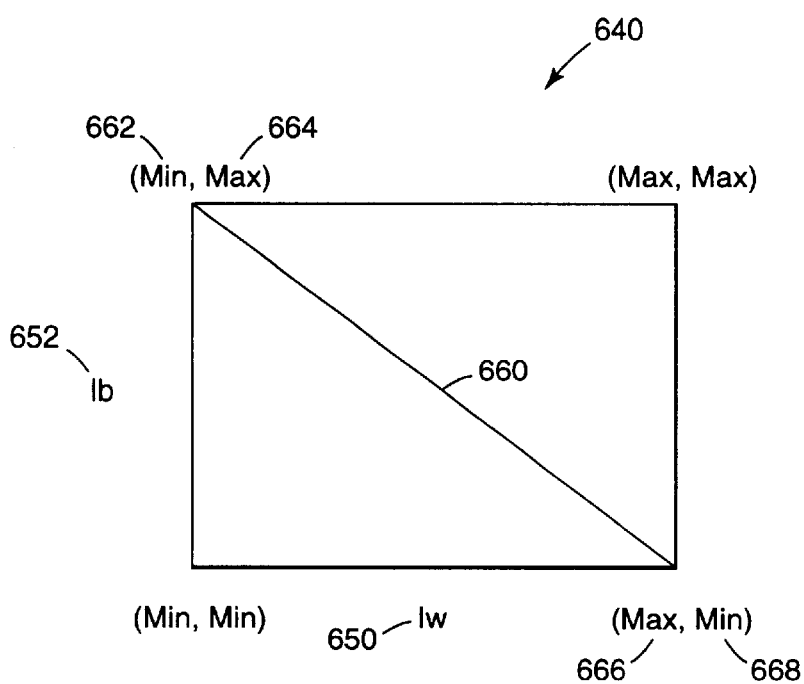

As described above with reference to FIG. 4, a head/reset action selection determines the action that is to be performed to determine what data recovery method is to be used. The MR bias current (Ib) and the write current (Iw) may be toggled according to a predetermined sequence. FIGS. 6a–b illustrate two excitation methods 600, 640 for toggling the MR bias current (Ib) and the write current (Iw) according to the present invention. The two excitation methods 600, 640 illustrated in FIGS. 6a–b may be used to attempt to establish two different states for the MR/GMR heads. For the same head, one of the excitation methods 600, 640 is to bring the head into a state with a relatively smaller MSE range, and the other brings the head into a state with a relatively larger MSE range. However, observations have indicated that the latter may actually make the average MSE smaller for some heads.

In FIG. 6a, the write current 610 and the bias current 612 are toggled along the diagonal 620. The toggling along diagonal 620 involves combining the minimal write current 622 with the minimal bias current 624 and combining the maximal write current 626 with the maximal bias current 628. In FIG. 6b, the write current 650 and the bias current 652 are toggled along the diagonal 660. The toggling along diagonal 660 involves combining the minimal write current 662 with the maximal bias current 664 and combining the maximal write current 666 with the minimal bias current 668.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for recovering data in a track during amplitude instability of a magnetic head, comprising:
   (a) initiating a data recovery procedure by selecting one of a plurality of detection modes for detecting when an error condition occurs;
   (b) performing the selected detection mode;
   (c) determining a type of magnetic head and a reset action for the type of head from a plurality of reset actions for resetting the magnetic head;
   (d) performing the determined reset action to reset the magnetic head; and
   (e) re-reading data in the track after performing the reset action.

2. The method of claim 1 further comprising:
   (f) determining whether the resetting of the magnetic head allowed recovery of the data in the track; and
   (g) terminating the data recovery procedure when the data is recovered.

3. The method of claim 2 further comprising:
   (h) determining whether predetermined limits have been exhausted when the data is not recovered;
   (i) terminating the data recovery procedure when the predetermined limits have been exhausted; and
   repeating steps (a)–(f) when the predetermined limits have not been exhausted.

4. The method of claim 1 wherein the selecting one of a plurality of detection modes further comprises choosing a mean square error procedure, an amplitude envelope procedure or a combination procedure.

5. The method of claim 4 wherein the mean square error procedure further comprises determining whether a mean square error range for data read in the track exceeds a predetermined mean square error limit.

6. The method of claim 5 wherein the performing the selected detection mode further comprises:
   reinitiating the data recovery procedure when the mean square error range for data read in the track does not exceed the predetermined mean square error limit; and
   returning to (c) when the mean square error range for data read in the track exceeds the predetermined mean square error limit.

7. The method of claim 4 wherein the amplitude envelope procedure further comprises determining whether an amplitude of a read signal is below a predetermined amplitude limit.

8. The method of claim 7 wherein the performing the selected detection mode further comprises:
   reinitiating the data recovery procedure when the amplitude of the read signal is not below the predetermined amplitude limit; and
   returning to (c) when the amplitude of the read signal is below the predetermined amplitude limit.

9. The method of claim 4 wherein the combination procedure further comprises:
   determining whether a mean square error range for data read in the track exceeds a predetermined mean square error limit;
   returning to (c) when the mean square error range for data read in the track exceeds the predetermined mean square error limit;
   determining when an amplitude of a read signal is below a predetermined amplitude limit when the mean square error range for data read in the track does not exceed the predetermined mean square error limit;
   reinitiating the data recovery procedure when the amplitude of the read signal is not below the predetermined amplitude limit; and
   returning to (c) when the amplitude of the read signal is below the predetermined amplitude limit.

10. The method of claim 1 wherein the the plurality of reset actions for resetting the magnetic head further comprises applying a maximum write current to the head, toggling a head bias current, toggling the head bias current and the write current, or applying a reset pulse to the head.

11. The method of claim 1 wherein the performing the determined reset action further comprises applying a maximum write current to the head.

12. The method of claim 1 wherein the performing the determined reset action further comprises toggling the head bias current.

13. The method of claim 1 wherein the performing the determined reset action further comprises toggling the head bias current and the write current.

14. The method of claim 1 wherein the performing the determined reset action further comprises applying a reset pulse to the head.

15. A disk drive, comprising:
a data storage medium;
a motor for moving the data storage medium relative to a magnetic head; and
a controller, the controller controlling the motor and the position of the magnetic head relative to the data storage medium, the controller further performing a data recovery procedure when the magnetic head experiences an amplitude loss by selecting one of a plurality of detection modes for detecting when an error condition occurs, performing the selected detection mode, determining a type of magnetic head and a reset action for the type of head from a plurality of reset actions for resetting the magnetic head, performing the determined reset action to reset the magnetic head and re-reading data in the track after performing the reset action.

16. The disk drive of claim 15 wherein the controller determines whether the resetting of the magnetic head allowed recovery of the data in the track and terminates the data recovery procedure when the data is recovered.

17. The disk drive of claim 16 wherein the controller determines whether predetermined limits have been exhausted when the data is not recovered, terminates the data recovery procedure when the predetermined limits have been exhausted and reinitiates the recovery procedure when the predetermined limits have not been exhausted.

18. The disk drive of claim 15 wherein the detection mode comprises a mean square error procedure, an amplitude envelope procedure or a combination procedure.

19. The disk drive of claim 18 wherein the controller performs the mean square error procedure by determining whether a mean square error range for data read in the track exceeds a predetermined mean square error limit.

20. The disk drive of claim 19 wherein the controller reinitiates the data recovery procedure when the mean square error range for data read in the track does not exceed the predetermined mean square error limit and begins the determination of a reset action when the mean square error range for data read in the track exceeds the predetermined mean square error limit.

21. The disk drive of claim 18 wherein the controller performs the amplitude envelope procedure by determining whether an amplitude of a read signal is below a predetermined amplitude limit.

22. The disk drive of claim 21 wherein the controller reinitiates the data recovery procedure when the amplitude of the read signal is not below the predetermined amplitude limit and begins the determination of a reset action when the amplitude of the read signal is below the predetermined amplitude limit.

23. The disk drive of claim 18 wherein the controller performs the combination procedure by determining whether a mean square error range for data read in the track exceeds a predetermined mean square error limit, begins the determination of a reset action when the mean square error range for data read in the track exceeds the predetermined mean square error limit, determines when an amplitude of a read signal is below a predetermined amplitude limit when the mean square error range for data read in the track does not exceed the predetermined mean square error limit, reinitiates the data recovery procedure when the amplitude of the read signal is not below the predetermined amplitude limit and begins the determination of a reset action when the amplitude of the read signal is below the predetermined amplitude limit.

24. The disk drive of claim 15 wherein the the plurality of reset actions for resetting the magnetic head further comprises applying a maximum write current to the head, toggling a head bias current or applying a reset pulse to the head.

25. The disk drive of claim 15 wherein controller performs the determined reset action by applying a maximum write current to the head.

26. The disk drive of claim 15 wherein the controller performs the determined reset action by toggling the head bias current.

27. The disk drive of claim 15 wherein the controller performs the determined reset action by toggling the head bias current and the write current.

28. The disk drive of claim 15 wherein the controller performs the determined reset action by applying a reset pulse to the head.

* * * * *